United States Patent
Kang

(10) Patent No.: US 9,995,192 B2
(45) Date of Patent: Jun. 12, 2018

(54) CRANKCASE VENTILATION DEVICE FOR VEHICLE

(71) Applicant: GM GLOBAL TECHNOLOGY OPERATIONS LLC, Detroit, MI (US)

(72) Inventor: Hyuk Jin Kang, Gyeonggi-do (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 154 days.

(21) Appl. No.: 15/021,265

(22) PCT Filed: Sep. 3, 2014

(86) PCT No.: PCT/KR2014/008231
§ 371 (c)(1),
(2) Date: Mar. 10, 2016

(87) PCT Pub. No.: WO2015/037862
PCT Pub. Date: Mar. 19, 2015

(65) Prior Publication Data
US 2016/0222847 A1    Aug. 4, 2016

(30) Foreign Application Priority Data
Sep. 10, 2013 (KR) .......................... 10-2013-0108714

(51) Int. Cl.
F02B 25/06 (2006.01)
F01M 13/02 (2006.01)
(Continued)

(52) U.S. Cl.
CPC ...... *F01M 13/028* (2013.01); *F01M 13/0011* (2013.01); *F01M 13/022* (2013.01); *F01M 13/023* (2013.01); *F02M 25/06* (2013.01)

(58) Field of Classification Search
CPC .... F01M 13/0011; F01M 13/04; F01M 13/00; F01M 13/022; F01M 13/028;
(Continued)

(56) References Cited

U.S. PATENT DOCUMENTS 4,686,946 A * 8/1987 Umeda ..................... F01L 1/12
123/572
8,978,631 B2 * 3/2015 Shudo .................... F01M 13/00
123/41.86
(Continued)

FOREIGN PATENT DOCUMENTS

DE    20 2006 017813 U1    3/2008
DE    10 2006 054117 A1    5/2008
(Continued)

OTHER PUBLICATIONS

ISA/KR, International Search Report dated Dec. 4, 2014 in International Application No. PCT/KR2014/008231, total 4 pages with English translation.
(Continued)

*Primary Examiner* — Marguerite McMahon
*Assistant Examiner* — Tea Holbrook
(74) *Attorney, Agent, or Firm* — Masuvalley & Partners

(57) ABSTRACT

The present invention relates to a crankcase ventilation device for a vehicle and, more specifically, to a crankcase ventilation device for a vehicle, which: prevents a back flow of blow-by gas to a new air inflow valve according to a rise in pressure and a rise in a flow rate inside a crankcase; prevents deterioration in the inside of an engine due to unburned fuel contained in the blow-by gas and minute particles of engine oil, generation of sludge, and an engine failure; and minimizes contamination of an intake system by providing a new air inflow control valve having a nozzle and a diaphragm, so as to block a back flow of the blow-by gas (Continued)

to a new air inflow hose due to an excessive rise in pressure inside the crankcase during a process for re-circulating and re-burning the blow-by gas discharged from the crankcase of the vehicle.

5 Claims, 5 Drawing Sheets

(51) Int. Cl.
    *F01M 13/00*     (2006.01)
    *F02M 25/06*     (2016.01)

(58) Field of Classification Search
    CPC ........... F01M 13/02; F01M 2013/0438; F01M 2013/0461; F01M 13/023; F01M 13/0405; F01M 1/10; F01M 2001/1021; F01M 2011/0029; F01M 9/101; F01M 25/06; F02M 25/06
    USPC ....................................... 123/41.86, 572–574
    See application file for complete search history.

(56) References Cited

U.S. PATENT DOCUMENTS

| | | | |
|---|---|---|---|
| 9,181,883 B2* | 11/2015 | Mavinahally | F02M 37/00 |
| 2004/0244783 A1* | 12/2004 | Ookawa | F01M 13/022 |
| | | | 123/572 |
| 2005/0045164 A1* | 3/2005 | Moriyama | F01M 13/025 |
| | | | 123/574 |
| 2008/0083399 A1* | 4/2008 | Hirano | F01M 13/02 |
| | | | 123/572 |
| 2008/0092864 A1* | 4/2008 | Suzuki | F01M 13/023 |
| | | | 123/574 |
| 2008/0223347 A1* | 9/2008 | Hommes | F01M 13/022 |
| | | | 123/572 |
| 2010/0089345 A1 | 4/2010 | Kim et al. | |
| 2010/0101514 A1* | 4/2010 | Hirano | F01M 13/022 |
| | | | 123/41.86 |
| 2010/0269804 A1* | 10/2010 | Miyaji | F02M 25/06 |
| | | | 123/572 |
| 2011/0073083 A1* | 3/2011 | Shiraishi | F01M 13/02 |
| | | | 123/574 |
| 2012/0204840 A1* | 8/2012 | Sugiyama | F02M 5/125 |
| | | | 123/495 |
| 2012/0247438 A1* | 10/2012 | Konohara | F01M 13/022 |
| | | | 123/559.1 |
| 2012/0312272 A1* | 12/2012 | Kobayashi | F01M 13/0416 |
| | | | 123/196 R |
| 2013/0074815 A1* | 3/2013 | Yuge | F01M 13/023 |
| | | | 123/574 |
| 2013/0282261 A1* | 10/2013 | Yamana | F02D 41/22 |
| | | | 701/111 |
| 2014/0026863 A1* | 1/2014 | Sumi | F02M 59/14 |
| | | | 123/495 |
| 2014/0224232 A1* | 8/2014 | Hotta | F02B 37/16 |
| | | | 123/574 |
| 2016/0265404 A1* | 9/2016 | Fujii | F01M 13/0416 |

FOREIGN PATENT DOCUMENTS

| | | | | |
|---|---|---|---|---|
| GB | 1406303 A | * | 9/1975 | ........... F01M 13/023 |
| JP | 06-010110 Y | | 3/1994 | |
| JP | 09-303128 A | | 11/1997 | |
| JP | 11-062564 A | | 3/1999 | |
| JP | 2006-250080 A | | 9/2006 | |
| KR | 10-1163786 B1 | | 7/2012 | |
| WO | WO 2010050367 A1 | * | 5/2010 | ............... F01M 3/02 |

OTHER PUBLICATIONS

EPO, Extended European Search Report dated May 12, 2017 in EP Application No. 14844241.1 (PCT Application No. PCT/KR2014/008231), total 7 pages.

* cited by examiner

⇒ Blow-by gas
⇒ Fresh air

Vaporized fuel is leaked

Blow-by gas is leaked

CRANKCASE VENTILATION DEVICE FOR VEHICLE

CROSS-REFERENCE TO RELATED APPLICATIONS

This application is a national stage entry under 35 U.S.C. § 371 of International Application No. PCT/KR2014/008231 filed on Sep. 3, 2014, and claims priority under 35 U.S.C. § 119 to Korean Patent Application No. 10-2013-0108714, filed on Sep. 10, 2013, which are hereby expressly incorporated by reference in their entirety for all purposes.

TECHNICAL FIELD

The present invention relates to a crankcase ventilation device for a vehicle, and more particularly to a crankcase ventilation device for a vehicle that includes a fresh air inflow control valve that includes a nozzle and a diaphragm therein in order to prevent a blow-by gas discharged from a crankcase of the vehicle from flowing backwards to a fresh air hose due to an excessive rise in the pressure in the interior of the crankcase in a process of recirculating and re-burning the blow-by gas.

BACKGROUND ART

Most internal combustion engines mounted on vehicles has a cycle of an intake stroke, a compression stroke, an explosion stroke, and an exhaust stroke, and in particular, a very small amount of mixed air is leaked through an aperture between a wall of a cylinder and a piston during the compression and explosion strokes.

The phenomenon is called a blow-by phenomenon, and the mixed air is called a blow-by gas.

Theoretically, if the space between the wall of the cylinder and the piston is sealed, the blow-by gas will not generated, but the blow-by phenomenon occurs in all vehicles because it is practically impossible to completely eliminate an aperture between the wall of the cylinder and the piston.

Most of the components of the blow-by gas is unburned fuels (HC), and the remaining components are burned gases, partially oxidized mixed gases, and a very small amount of engine oil.

Because the blow-by gas significantly contaminates the atmospheric environment, the recent vehicles have been required to recirculate the blow-by gas into the crankcase, and re-burn and discharge the blow-by gas.

Accordingly, the methods of ventilating the interior of a crankcase include positive crankcase ventilation (PCV), and Korean Patent No. 1163786 discloses a method of recirculating and re-burning a blow-by gas by mounting a PCV valve that may control flow rate according to a pressure difference between an intake manifold and a crankcase, in which because the amount of generated blow-by gas increases as the load of an engine rises, an intake system including an air cleaner, an air inflow part, and an intake manifold is contaminated as the blow-by gas flows backwards to a fresh air inflow hose, and the engine deteriorates, sludge is generated, and in severe cases, an engine failure can be generated as the viscosity of the engine oil lowers and smooth lubrication is hampered.

(Patent Document 1) KR 1163786 B1

DISCLOSURE

Technical Problem

The present invention has been made in an effort to solve the above-mentioned problems, and an object of the present invention is to solve contamination problems of an intake system as well as deterioration of an engine, generation of sludge, and an engine failure that are generated when a blow-by gas of a crankcase ventilation device flows backwards.

Technical Solution

In order to achieve the above objects, the present invention provides a crankcase ventilation device for a vehicle including: a crankcase (400); a cam cover (300) situated on the upper side of the crank case (400); a fresh air inflow control valve (310) one side of which is connected to the cam cover (300) and an opposite side of which is connected to a fresh air inflow hose (220) so that fresh air is introduced into the crank case (400); and a pressure control valve (320) situated on the upper side of the cam cover 300 to control a pressure in the crankcase (400).

It may be preferable that a nozzle (311) is situated in the interior of the fresh air inflow hose (220) of the fresh air inflow control valve (310), and the nozzle (311) controls inflows of the fresh air into the crankcase (400) according to a control of the pressure in the crankcase (400) of the pressure control valve (320).

It may be preferable that a diaphragm (312) is situated on the lower side of the nozzle (311) to prevent backward flows of a blow-by gas to the fresh air inflow hose (220).

It may be preferable that the crankcase ventilation device further includes: an oil separator (330) communicated with the pressure control valve (320) to separate oil particles from the blow-by gas discharged from the crank case (400).

It may be preferable that the pressure control valve (320) is any one of an orifice valve, a pressure reducing valve, and a solenoid valve electrically connected to an ECU.

It may be preferable that in a low-speed/middle-speed of an engine provided with the crankcase ventilation device for a vehicle, the pressure control valve (320) is opened according to the amount of generated blow-by gas in the crankcase (400) such that the blow-by gas in the crankcase (400) flows into the intake manifold (500) and is mixed with the fresh air supplied from the air inflow hose 210 to be reintroduced into the crankcase (400) and burned again, and the fresh air is introduced into the crankcase (400) through the fresh air inflow control valve (310).

It may be preferable that in a high-speed condition of an engine provided with the crankcase ventilation device for a vehicle, the amount of the blow-by gas in the crankcase (400) increases so that when the blow-by gas is introduced into the fresh air inflow hose (220), the blow-by gas is prevented from being introduced into the fresh air inflow hose (220) through the fresh air inflow control valve (310).

Advantageous Effects

As described above, in the crankcase ventilation device for a vehicle according to the present invention, because a fresh air inflow control valve is installed, deterioration of the interior of the engine, generation of sludge, and an engine failure phenomenon can be prevented by preventing backward flows of a blow-by gas into the fresh air inflow valve due to rises in the pressure of the crankcase and flow rate, and contamination of an intake system can be minimized.

DESCRIPTION OF THE INVENTION

BEST MODE

The elements constituting the crankcase ventilation device for a vehicle according to the present invention may be integrally used or separately used as occasion demands. Further, some elements may be omitted according to an in-use form.

A preferred embodiment of the crankcase ventilation device for a vehicle according to the present invention will described with reference to the accompanying drawings. It should be noted that the drawings are not to precise scale and may be exaggerated in thickness of lines or size of components for descriptive convenience and clarity. In addition, terms used herein are defined by taking functions of the present invention into account and can be changed according to user or operator custom or intention. Therefore, definition of the terms should be made according to the overall disclosure set forth herein.

Hereinafter, an embodiment of the crankcase ventilation device 1000 for a vehicle according to the present invention will be described with reference to the accompanying drawings.

Figure 1:
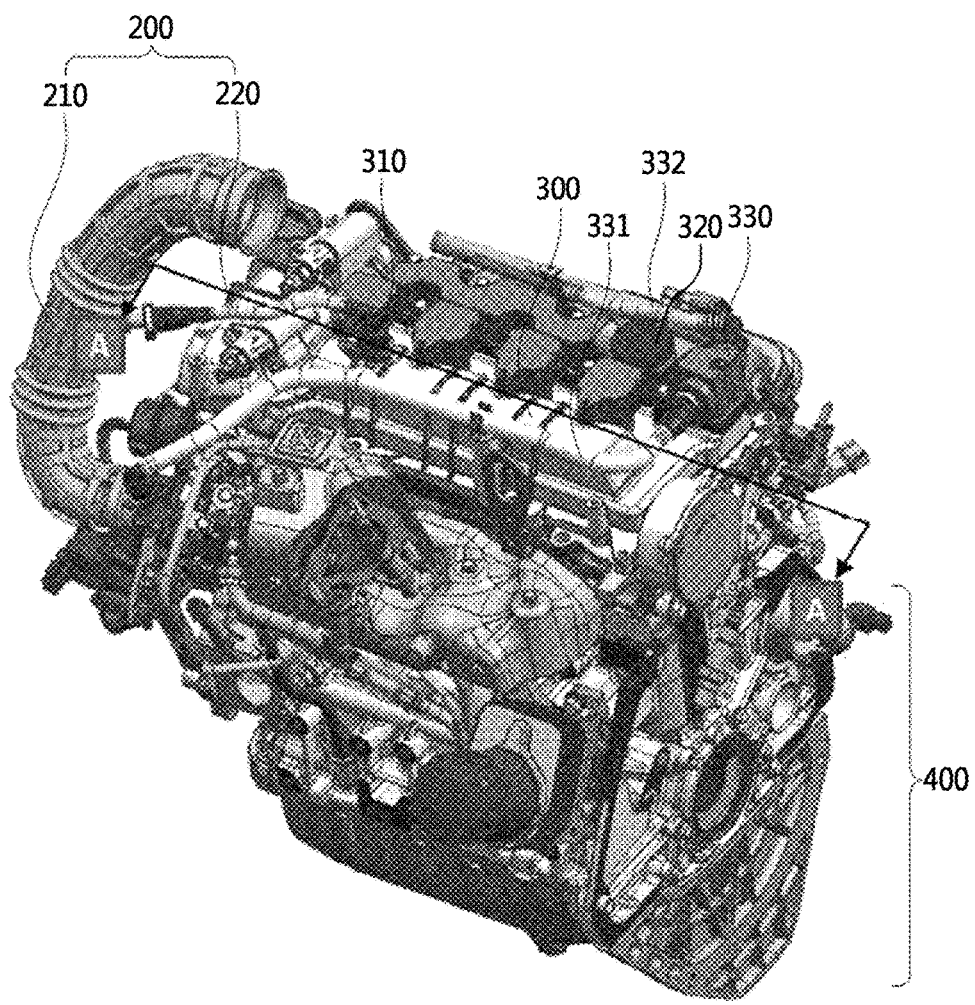
FIG. 1 is a perspective view illustrating the entire external appearance of a crankcase ventilation device 1000 for a vehicle according to an embodiment of the present invention.
Figure 2:
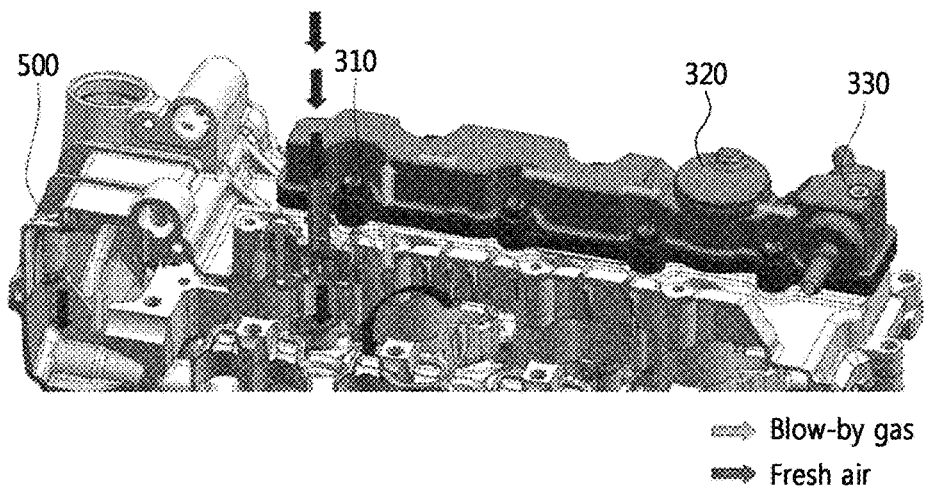
FIG. 2 is a sectional view of the crankcase ventilation device 1000 for a vehicle taken along line A-A of FIG. 1.

As illustrated in FIG. 1, the crankcase ventilation device 1000 for a vehicle according to an embodiment of the present invention includes an air cleaner 100 (see FIGS. 5 and 6), a crankcase 400, a cam cover 300 coupled to an upper side of the crankcase 400, an intake manifold 500 (see FIG. 2) coupled to a lateral side of the crankcase 400, and an air inflow part 200 one side of which is connected to the air cleaner 100 and an opposite side of which is connected to the intake manifold 500.

A turbo charger that compresses and introduces air to increase engine efficiency may be situated between the air cleaner 100 and the air inflow part 200 (the turbo charger is not illustrated).

The air cleaner 100 purifies air such that the air mixed with dust and the like is not introduced into the crankcase 400, and introduces the air into the crankcase 400.

The air inflow part 200 includes an air inflow hose 210 and a fresh air inflow hose 220.

One side of the air inflow hose 210 is connected to the air cleaner 100 and an opposite side of the air inflow hose 210 is connected to the intake manifold 500 so that the air purified by the air cleaner 100 is introduced into the intake manifold 500.

Accordingly, the air purified in the intake manifold 500 is mixed with a blow-by gas and is introduced into the crankcase 400.

One side of the fresh air inflow hose 220 is connected to an outer peripheral surface of the air inflow hose 210 and an opposite side of the fresh air inflow hose 220 is connected to the fresh air inflow control valve 310 so that the air that is not mixed with the blow-by gas, that is, the fresh air is introduced into the crankcase 400.

Figure 3A:
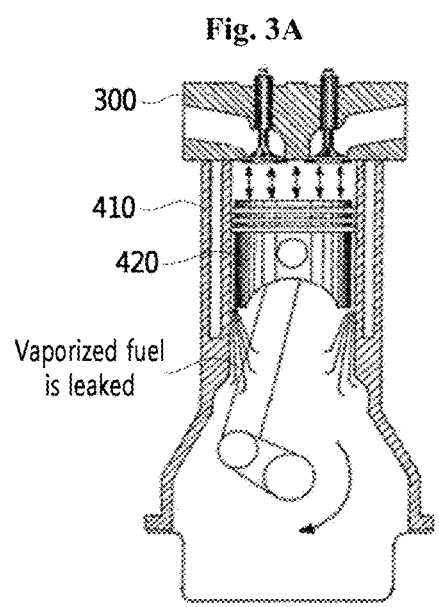
FIG. 3A and FIG. 3B are views illustrating generation of a blow-by gas in the interior of a crankcase 400.
Figure 3B:
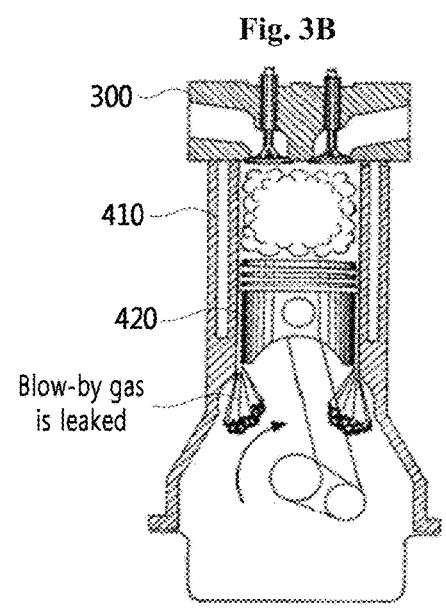

As illustrated in FIG. 3A and FIG. 3B, a cylinder 410 is situated in the interior of the crankcase 400, and a cycle of an intake stroke, a combustion stroke, an explosion stroke, and an exhaust stroke is performed while a piston 420 is moved upwards and downwards in the cylinder 410, and then a blow-by gas produced at an upper portion of the cylinder 410 is leaked through an aperture between a wall of the cylinder 410 and the piston 420 and is introduced into the crankcase 400.

The cam cover 300 is coupled to an upper portion of the crankcase 400 to seal the interior of the crankcase 400, and includes a fresh air inflow control valve 310, a pressure control valve 320, and an oil separator 330.

One side of the fresh air inflow control valve 310 is connected to the fresh air inflow hose 220 and an opposite side of the fresh air inflow control valve 310 is connected to the cam cover 300 so that the fresh air from the fresh air inflow hose 220 is introduced into the interior of the crank case 400.

Figure 4:
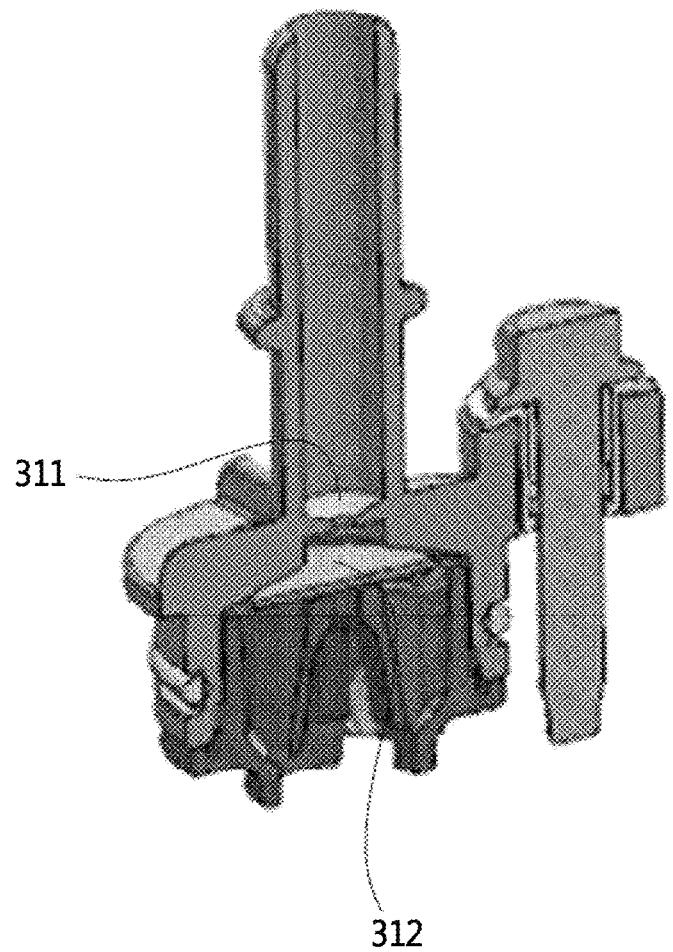
FIG. 4 is a sectional view of a fresh air inflow control valve 310.

As illustrated in FIG. 4, the fresh air inflow control valve 310 includes a nozzle 311 and a diaphragm 312 therein.

The nozzle 311 is situated inside the fresh air inflow control valve 310 to introduce a suitable amount of fresh air into the crank case 400.

The diaphragm 312 has a thin plate that may be opened and closed according to pressure in order to allows air to flow only in one direction and is situated below the nozzle 311, and is closed if a pressure in the crankcase 400 rises to prevent the blow-by gas in the crank case 400 from flowing backwards to the air inflow part 200 through the fresh air inflow hose 220.

The pressure control valve 320 is situated on the upper side of the cam cover 300 and is communicated between the crank case 400 and the intake manifold 500 so that a change in the internal pressure of the crank case 400 is controlled according to a turbo charging pressure of the compressed air introduced from the turbo charger (not illustrated) according to a pressure difference between opposite sides of the pressure control valve 320 and a load of the engine.

Accordingly, the pressure control valve 320 is opened and closed according to the change in the internal pressure of the intake manifold 500 to allow the blow-by gas in the crank case 400 to be introduced into the intake manifold 500.

The pressure control valve 320 may be an orifice valve, a pressure reducing valve, or a solenoid valve that is electrically connected to an electronic control unit (ECU) that detects a change in pressure.

The oil separator 330 is communicated with the pressure control valve 320 to separate engine oil particles mixed with the blow-by gas introduced into the crank case 400.

As illustrated in FIG. 1, two pipes are provided at an upper portion of the crankcase ventilation device such that a recirculation hose 331 is connected to one of the pipes to introduce the blow-by gas, from which engine oil is separated, into the air inflow part 200 so that the introduced blow-by gas is mixed with fresh air and is introduced into the intake manifold 500 and a bypass hose 332 is connected to the other of the pipes to directly introduce the blow-by gas into the intake manifold 500.

Furthermore, when the turbo charger (not illustrated) is installed, the blow-by gas introduced from the recirculation hose 331 into the air flow part 200 is mixed with the compressed air introduced from the turbo charger and is introduced into the intake manifold 500.

Figure 5:
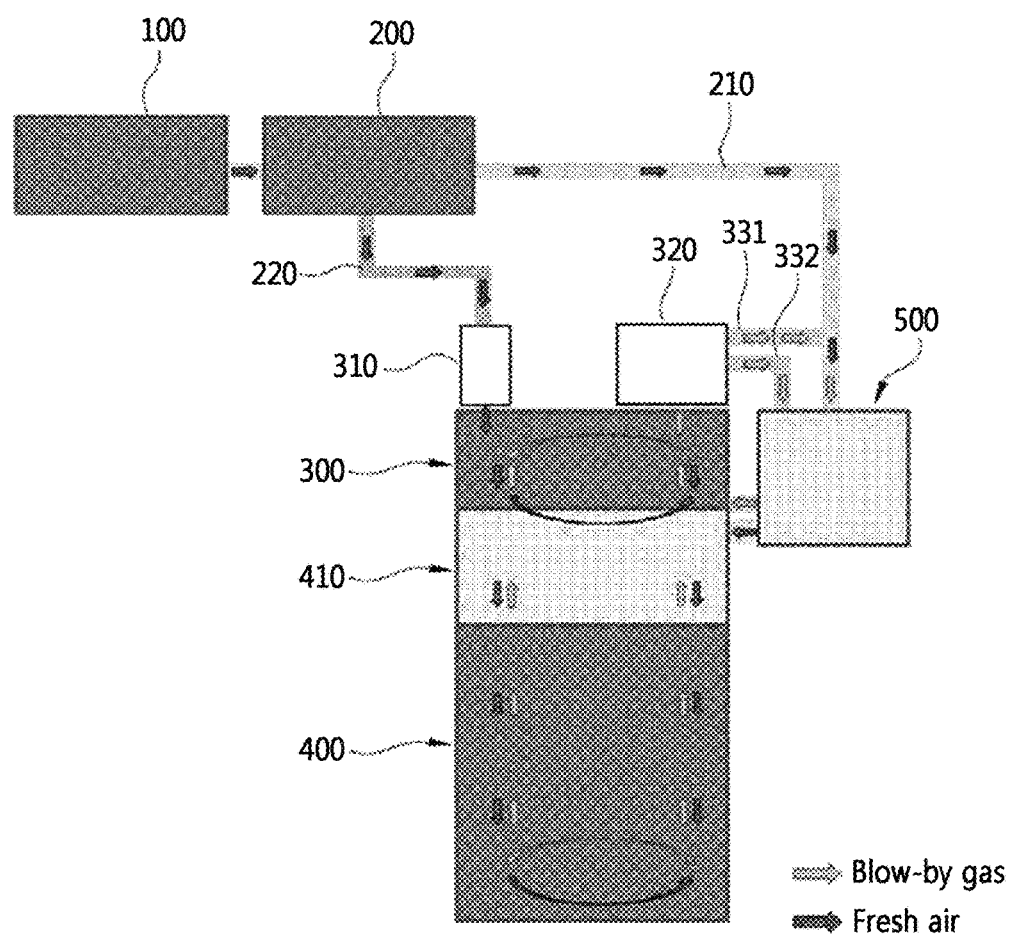
FIG. 5 is a view illustrating flows of a fresh air and a blow-by gas of the crankcase ventilation device 1000 under a low-speed/middle-speed condition.
Figure 6:
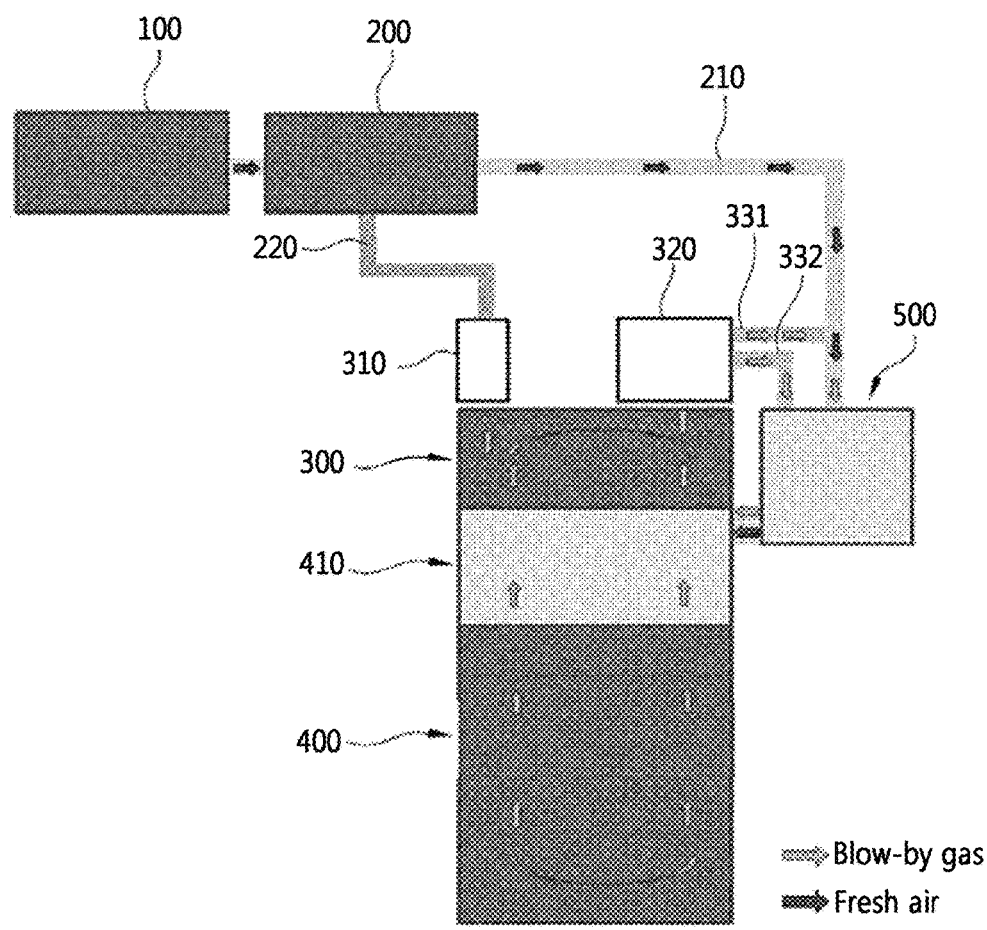
FIG. 6 is a view illustrating flows of a fresh air and a blow-by gas of the crankcase ventilation device 1000 under a high-speed condition.

Hereinafter, the flows of the fresh air and the blow-by gas in the crankcase ventilation device 100 according to an engine condition will be described with reference to FIGS. 5 and 6.

First, the flows of the fresh air and the blow-by gas in a low-speed/middle-speed condition will be described with reference to FIG. 5.

Here, the "low-speed/middle-speed condition" refers to a state in which a partial load is applied to the engine, and means a state in which a throttle that adjusts an amount of the fuel supplied to the engine is partially opened, that is, a partial throttle state and does not mean that the speed of the vehicle itself is a low speed or a middle speed.

In this condition, because the amount of generated blow-by gas is not large, the pressure in the crankcase 400 does not significantly rise so that the pressure control valve 320 is slightly opened, and the blow-by gas in the crankcase 400 flows to the intake manifold 500 and is mixed with the fresh air introduced from the air inflow hose 210 in the intake manifold 500 to be reintroduced into the crankcase 400 and burned again.

The fresh air is introduced into the crankcase 400 through the fresh air inflow control valve 310.

Next, the flows of the fresh air and the blow-by gas at a high-speed condition will be described with reference to FIG. 6.

Here, the "high-speed condition" refers to a state in which a full load is applied to the engine, and means a state in which the throttle is completely opened, that is, a full throttle state.

In this condition, because the amount of the blow-by gas increases, the pressure in the crankcase 400 significantly rises, and the pressure control valve 320 is opened by a large degree and the flow rate of the blow-by gas introduced into the intake manifold 500 increases in the crankcase 400.

Accordingly, the blow-by gas in the crankcase 400 is not entirely introduced into the intake manifold 400, but flows backwards to the fresh air inflow hose 220.

Then, the diaphragm 312 in the interior of the fresh air inflow control valve 310 situated in the cam cover 300 prevents the backward flow phenomenon so that the blow-by gas is introduced only to the intake manifold 500.

Although the embodiment of the present invention illustrated in the drawings has been described so that those skilled in the art can easily reproduce and implement the present invention, it is merely exemplary and it will be understood by those skilled in the art that various modifications and equivalent embodiments can be made. Therefore, the scope of the present invention should be determined according to the claims.

The invention claimed is:

1. A crankcase ventilation device for a vehicle comprising:
    a crankcase (400); and
    a cam cover (300) situated on the upper side of the crank case (400) to seal the crankcase (400);
    wherein the cam cover (300) comprises:
    a fresh air inflow control valve (310) situated on the cam cover (300), one side of which is connected to the cam cover (300) and an opposite side of which is connected to a fresh air inflow hose (220) so that fresh air is introduced into the crank case (400); and
    a pressure control valve (320) situated on the upper side of the cam cover (300) to control a pressure in the crankcase (400);
    wherein a nozzle (311) is situated in the interior of the fresh air inflow hose (220) of the fresh air inflow control valve (310), and the nozzle (311) controls inflows of the fresh air into the crankcase (400) according to a control of the pressure in the crankcase (400) of the pressure control valve (320);
    wherein a diaphragm (312) is situated on the lower side of the nozzle (311) to prevent backward flows of a blow-by gas to the fresh air inflow hose (220).

2. The crankcase ventilation device according to claim 1, further comprising:
    an oil separator (330) communicated with the pressure control valve (320) to separate oil particles from the blow-by gas discharged from the crank case (400).

3. The crankcase ventilation device according to claim 2, wherein the pressure control valve (320) is any one of an orifice valve, a pressure reducing valve, and a solenoid valve electrically connected to an ECU.

4. The crankcase ventilation device according to claim 1, wherein in a low-speed/middle-speed of an engine provided with the crankcase ventilation device for a vehicle, the pressure control valve (320) is opened according to the amount of generated blow-by gas in the crankcase (400) such that the blow-by gas in the crankcase (400) flows into an intake manifold (500) and is mixed with the fresh air supplied from the air inflow hose (210) to be reintroduced into the crankcase (400) and burned again, and the fresh air is introduced into the crankcase (400) through the fresh air inflow control valve (310).

5. The crankcase ventilation device according to claim 1, wherein in a high-speed condition of an engine provided with the crankcase ventilation device for a vehicle, the amount of the blow-by gas in the crankcase (400) increases so that when the blow-by gas is introduced into the fresh air inflow hose (220), the blow-by gas is prevented from being introduced into the fresh air inflow hose (220) through the fresh air inflow control valve (310).

* * * * *